United States Patent [19]
Itoh

[11] Patent Number: 5,859,748
[45] Date of Patent: Jan. 12, 1999

[54] MAGNETIC HEAD DEVICE INCLUDING AN IMPROVED SLIDER SHAPE

[75] Inventor: Jun Itoh, Kanagawa, Japan

[73] Assignee: Kabushiki Kaisha Toshiba, Kawasaki, Japan

[21] Appl. No.: 359,699

[22] Filed: Dec. 20, 1994

[30] Foreign Application Priority Data

Dec. 22, 1993 [JP] Japan ..................................... 5-325234
Mar. 18, 1994 [JP] Japan ..................................... 6-048093

[51] Int. Cl.$^6$ ............................... G11B 5/48; G11B 5/60
[52] U.S. Cl. ............................................................ 360/103
[58] Field of Search ................................... 360/103, 104, 360/102

[56] References Cited

U.S. PATENT DOCUMENTS

| | | | |
|---|---|---|---|
| 4,901,185 | 2/1990 | Kubo et al. ................................ | 360/103 |
| 5,041,932 | 8/1991 | Hamilton ................................... | 360/104 |
| 5,198,934 | 3/1993 | Kubo et al. ................................ | 360/106 |
| 5,285,337 | 2/1994 | Best et al. ................................. | 360/103 |
| 5,383,073 | 1/1995 | Masukawa et al. ...................... | 360/103 |

FOREIGN PATENT DOCUMENTS 5-74090  3/1993  Japan .

*Primary Examiner*—John H. Wolff
*Attorney, Agent, or Firm*—Finnegan, Henderson, Farabow, Garrett & Dunner, L.L.P.

[57] ABSTRACT

A magnetic head device for reading information from or writing information to a rotating magnetic recording medium includes a magnetic pole for reading information from or writing information to the medium and a slider for supporting the magnetic pole and moving the magnetic pole on the medium. The slider includes a contact portion for supporting the magnetic pole, and keeping the magnetic pole in contact with the medium, a positioned member flying above the medium, the flying member having a first surface where dynamic pressure generated by fluid-flow caused by rotation of the medium, and a connecting member having a mass less than that of the flying member, the connecting member connecting between the contact portion and the flying member.

10 Claims, 15 Drawing Sheets

MAGNETIC HEAD DEVICE INCLUDING AN IMPROVED SLIDER SHAPE

BACKGROUND OF THE INVENTION

1. Field of the Invention

The present invention relates to a magnetic head device and a magnetic disk drive which is capable of reading information from or writing to a magnetic recording medium, as the magnetic head device is kept in contact with the magnetic recording medium.

2. Description of the Related Art

Efforts continue to increase the recording density of a magnetic disk drive using a hard disk. Due to the increase of recording density, the spacing between a magnetic head device (called "head" hereinafter) and a magnetic recording disk (called "disk" hereinafter) serving as a magnetic recording medium, is decreasing. Ultimately, it will be necessary to read/write information on the disk as the head is kept in contact with the disk.

The most important problem for carrying out the contact reading/writing is to reduce wear of the head and the disk. In order to reduce the wear, it is necessary to keep the contact force applied between the head and the disk at a low level and stable.

A brief structure of a prior art head having a taper-flat type slider will be described with reference to FIG. 13.

A taper-flat type slider 100 has a slider surface 102 which is opposed to a disk 101. The slider surface 102 includes a tapered surface 102a being slanted in a direction close to the disk along the rotating direction of the disk(shown by the arrow in FIG. 13), and a flat surface 102b being substantially parallel to the disk, when the disk stops rotating. Dynamic pressure (gage pressure) Ph generated by fluid-flow caused by rotation of the disk is applied to the slider surface 102. According to the flying slider method used in a prior art hard disk drive, the slider 100 flies above the disk 101 at a predetermined distance by means of the dynamic pressure Ph. In this case, however, the trailing edge serving as a contact portion 103 of the slider 102 is kept in contact with the surface of the disk 101. A magnetic pole(not shown) is mounted on the contact portion 103 to read/write information on the disk 101, as the magnetic pole is kept in contact with the disk.

There are three forces being applied to the slider 100 when the disk 101 rotates. They are a load F, a fluid force fh, and a contact force fc. The load F is applied at a pivot position 104 by a suspension (not shown). The fluid force is a sum of the dynamic pressure Ph. It is applied at the position 105 at the center of the distribution of the dynamic pressure Ph. The contact force is applied at the contact portion 103 from the disk 101.

The relation of these forces (F, fh, fc) is shown in the following equation (1).

$$fc = \frac{lh - lp}{lh} F \quad (1)$$

"lp" is the lateral distance between the pivot position 104 and the contact portion 103, and "lh" is the lateral distance between the position 105 where the fluid force is applied and the contact portion 103.

According to equation (1), it is necessary that the distance lh becomes long and a distance between the position 105 and the pivot position 104 is short, in order to keep the contact force fc at a low level. However, in the prior art taper-flat type slider, it is difficult to set the distance lh to be long, because the position 105 is located along the rotating direction of the disk 101 from the center of the total length of the slider 100.

The variation of the contact force fc according to the positioning error between the slider surface 102 and the contact portion 103 will be described.

As shown in FIG. 14, the slider 100 has three degrees of freedom. They are pitching(108), rolling(107), and translational(106) degrees of freedom. Stiffness of the fluid film between the slider surface 102 and the surface of the disk 101 keeps the condition of the slider 100 stable with regard to the three degrees of freedom. For example, the pitching stiffness will be described with reference to FIGS. 15(a)–15(c). FIG. 15(b) shows the standard condition of the slider. If the angle α' formed between the slider surface 102 and the surface of the disk 101 (pitch angle) becomes smaller than the pitch angle α in the standard condition, as shown in FIG. 15(a), moment 109 occurs to restore the pitch angle. If the pitch angle α" becomes larger than the pitch angle α in the standard condition, as shown in FIG. 15(c), moment 110 also occurs to restore the pitch angle. According to the prior art taper-flat type slider, the slider surface 102 is formed long enough to secure the pitching stiffness in the rotating direction of the disk.

When a positioning error between the slider surface 102 and the contact portion 103 is made, the contact force fc varies. This variation of the contact force fc will be described with reference to FIGS. 16(a)–16(c).

FIG. 16(b) shows the standard condition. FIG. 16(a) shows the condition that the contact portion 103 extends further than the contact portion of the standard condition. In this case, as the pitch angle α' in FIG. 16(a) becomes smaller than the pitch angle α in the standard condition, the moment 109 occurs to restore the pitch angle. Therefore, the contact force increases by dfc to balance the moment 109.

FIG. 16(c) shows the condition that the contact portion 103 is recessed relative to the contact portion of the standard condition. In this case, as the pitch angle α" becomes larger than the pitch angle α in the standard condition, the moment 110 occurs to restore the pitch angle. therefore, the contact force decreases. Finally, the contact force fc becomes zero, and the slider 100 floats above the disk 101.

The influence of inertia which occurs due to the undulation of the disk, the vibration of the disk, or shock applied to the device from outside will be described with reference to FIG. 17. The inertia fg is applied at the center of gravity of the head (G) depending on the mass of the slider 100 and equivalent mass of the suspension (not shown). The position of G is located on the line connecting the center of gravity of the slider 100 (Gh) with the pivot position (Gp) where the equivalent mass of the suspension is applied. The inertia fg is divided between the variation of the fluid force dfh and the variation of the contact force dfc. The variation of the contact force dfc is shown in the following equation (2).

$$dfc = \frac{lh - lg}{lh} fg \quad (2)$$

"lg" is the lateral distance between the position of G and the contact portion 103.

According to equation (2), it is necessary for the distance lh between the position 105 where the fluid force is applied and the contact portion 103 to be long and for the position 105 to be located near the position of G in order to reduce the variation of the contact force dfc. But, in the prior art taper-flat type slider, it is difficult to set the distance lh to be long, because the position 105 and the pivot position (Gp)

are located along the rotating direction of the disk 101 from the center of the total length of the slider 100.

A phenomenon of stiction between the head and the disk will be described. In a prior art magnetic disk drive having a flying type slider, the slider lands on the disk and the slider surface is kept in contact with the surface of the disk, when the disk stops rotating. It is called a constant•start•stop method (CSS method) as usual. According to the CSS method, stiction occurs by the influence of water or lubricant existing between the slider and the disk. Stiction prevents the disk from starting to rotate. In the prior art, the surface of the disk is made uneven to prevent stiction. However, it is necessary for the surface of the disk to be flat in the case of contact reading/writing. so that the the contact condition is stable. Therefore, stiction is a significant problem in the practice of contact reading/writing.

SUMMARY OF THE INVENTION

An object of the present invention is to provide a magnetic head device which can maintain a contact condition between the magnetic head device and a magnetic recording medium stably, which can maintain a contact force being applied to the magnetic head device from the magnetic recording medium at a low level, and which can reduce wear of the magnetic head device and the magnetic recording medium.

Another object of the present invention is to provide a magnetic disk drive for which life can be extended, as the wear of the magnetic head device and the magnetic recording medium is reduced.

In accordance with the present invention, there is provided a magnetic head device for reading information from or writing information to a rotating magnetic recording medium, comprising: a magnetic pole for reading the information from or writing the information to the medium; and a slider supporting the magnetic pole, and to move the magnetic pole on the medium; the slider including: a contact portion supporting the magnetic pole, and to contact the medium, a flying member to fly above the medium, having a first surface for confronting the medium to receive dynamic pressure generated by fluid-flow caused by rotation of the medium, and a connecting member having a mass less than that of the flying member, coupled between the contact portion and the flying member.

Also in accordance with the present invention, there is provided a magnetic head device for reading information from or writing information to a rotating magnetic recording medium, comprising: a magnetic pole for reading the information from or writing the information to the medium; a slider supporting the magnetic pole, and to move the magnetic pole on the medium; the slider including: a contact portion supporting the magnetic pole, and to contact the medium, a flying member to fly above the medium, having a first surface for confronting the medium to receive dynamic pressure generated by fluid-flow caused by rotation of the medium; and means for applying a load to the slider to balance with the dynamic pressure and a contact force applied to the contact portion from the medium, wherein the first surface is a curved surface, a center of curvature of the first surface being proximate a position where the load is applied.

Further in accordance with the present invention there is provided a magnetic disk drive, comprising: a magnetic recording disk; means for rotating the disk; and a magnetic head device for reading information from or writing information to the disk; the head device including; a magnetic pole for reading the information from or writing the information to the disk, and a slider supporting the magnetic pole, and to move the magnetic pole on the disk; the slider including: a contact portion supporting the magnetic pole, and to contact the disk, a flying member to fly above the disk, having a first surface for confronting the disk to receive dynamic pressure generated by fluid-flow caused by rotation of the disk, and a connecting member having a mass less than that of the flying member, coupled between the contact portion and the flying member.

Additionally in accordance with the present invention, there is provided a magnetic disk drive, comprising: a magnetic recording disk; means for rotating the disk; a magnetic head device for reading information from or writing information to the disk; the head device including; a magnetic pole for reading the information from or writing the information to the disk, and a slider supporting the magnetic pole, and to move the magnetic pole on the disk; the slider including: a contact portion supporting the magnetic pole, and to contact the disk, a flying member to fly above the disk, having a first surface for confronting the desk to receive dynamic pressure generated by fluid-flow caused by rotation of the disk; and means for applying a load to the slider to balance with the dynamic pressure and a contact force applied to the contact portion from the disk, wherein the first surface is a curved surface, a center of curvature of the first surface being proximate a position where the load is applied to the slider.

Additional objects and advantages of the present invention will be set forth in the description which follows, and in part will be obvious from the description, or may be learned by practice of the present invention, or may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Embodiments of the present invention will now be described with reference to accompanying drawings.

Figure 1A:
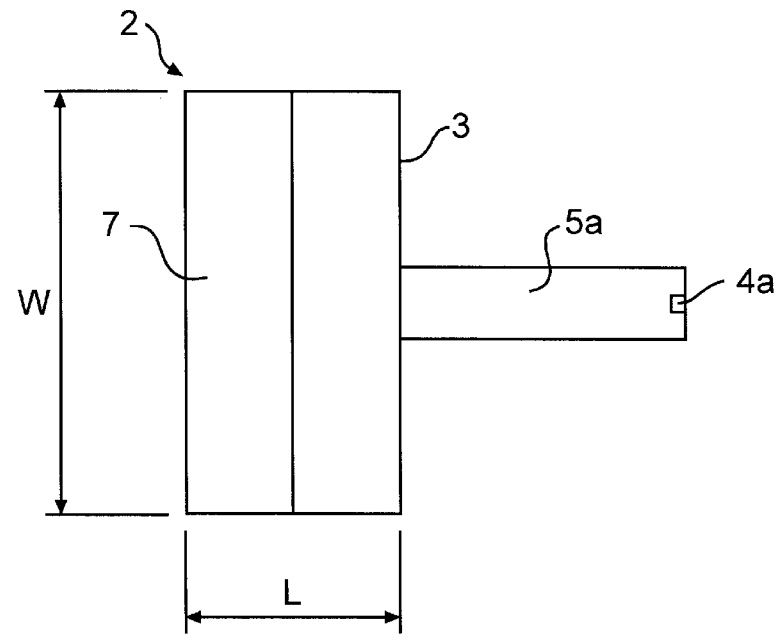
FIGS. 1(*a*)–1(*c*) show top, side and end schematic views of a magnetic head device according to a first embodiment of the present invention.

A structure of a magnetic head device according to the first embodiment of the present invention will be described with reference to FIGS. 1(a)–1(c) which are top, side and end views, respectively.

A magnetic head device (called "head" hereinafter) comprises a magnetic pole (not shown) and a slider 2. The slider 2 includes a flying member 3, a contact portion 4, and a connecting member 5. The connecting member 5 is located between the flying member 3 and the contact portion 4. The slider 2 is formed to have a generally T-letter shape. The magnetic pole is mounted on the contact portion 4, so that it reads/writes information to a magnetic recording disk (call "disk" hereinafter, not shown). A load F is applied to the slider 2 at a pivot position 6 with a suspension (not shown). The load F is divided between a fluid force fh, which is a sum of dynamic pressure generated by fluid-flow caused by rotation of the disk, and a contact force fc applied to a contact surface 4a of the contact portion 4 from the disk. The relation of these forces (F, fh, fc) is shown in previously described equation (1).

The connecting member 5 has a surface 5a which confronts the disk. The area of the surface 5a is smaller than that of a surface 7 of the flying member 3 which confronts the disk (slider surface). The surface 5a is recessed from the slider surface 7. The contact surface 4a has a very small area, so that the dynamic pressure applied to the contact surface 4a is small. According to this structure, the fluid force fh is mainly applied to the slider surface 7. A position 8 where the fluid force fh is applied is located far from the contact portion 4. As a result, it is possible to keep the contact force fc at a low level, because the distance lh between the position 8 and the contact portion 4 becomes long in equation (1).

The mass of the connecting member 5 is less than that of the flying member 3. The center of gravity of the head (G) depends on the mass of the flying member 3 and equivalent mass of the suspension. In the previously described equation (2), a distance lg between the position of G and the contact portion 4 becomes long. As a result, it is possible to reduce the variation of the contact force fc caused by inertia which occurs due to the undulation of the disk, the vibration of the disk, or an external shock applied to the device. Particularly, when the distance lg is equal to the distance lh, the inertia is balanced with the fluid force fh only, so the contact force fc does not vary.

Figure 1B:
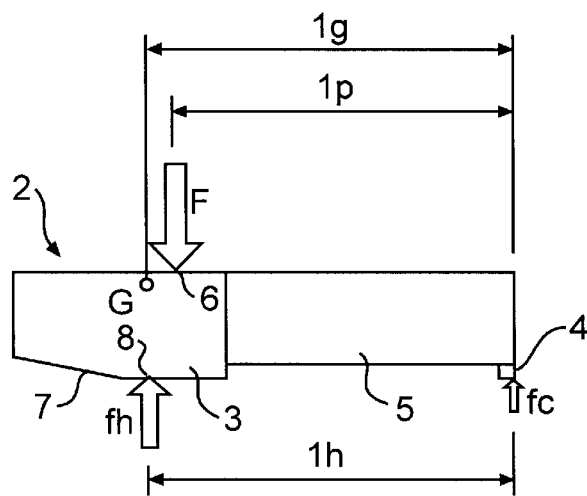
Figure 1C:
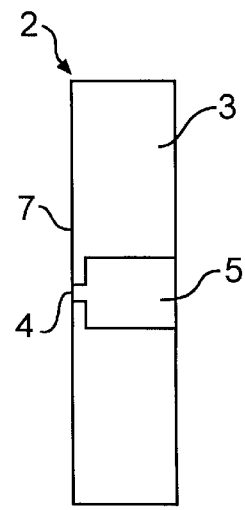

The maximum length L of the slider surface 7 along the rotating direction of the disk (shown by the arrow in FIG. 1(b)) is shorter than the maximum width W of the slider surface 7 along the direction substantially perpendicular to the rotating direction of the disk. This structure is opposite to the prior art taper-flat type slider. As the length L becomes shorter, the pitching stiffness of the fluid film between the slider surface 7 and the surface of the disk becomes lower. Therefore it is possible to reduce the variation of the contact force fc according to the positioning error between the slider surface 7 and the contact portion 4. As the width W becomes larger, the translational stiffness and rolling stiffness of the fluid film between the slider surface 7 and the surface of the disk are higher.

According to the prior art flying type slider, it is necessary to provide a very small space between the slider and the disk, and the dimensional accuracy of the slider must be kept at a high level. If the dimensional accuracy is reduced, it is difficult to achieve sufficient read/write performance, and a collision occurs between the slider and the disk. However, by utilizing the head of the first embodiment, the flying member 3 is far from the contact portion 4. Therefore, it is possible to have a larger spacing than that of the flying type slider, and it is not necessary to keep the dimensional accuracy so high.

Figure 2:
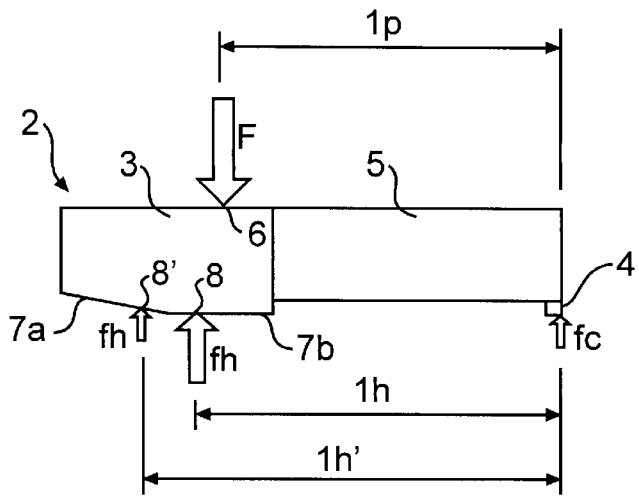
FIG. 2 is a explanatory view showing a variation of the position where the fluid force is applied in FIG. 1.

FIG. 2 shows a variation of the position where the fluid force is applied, when the disk rotates constantly or starts to rotate.

The slider surface 7 includes a tapered surface 7a slanted in a direction close to the disk along the rotating direction of the disk, and a flat surface 7b substantially parallel to the disk, when the disk stops rotating. When the disk rotates at constant rate, the position 8 where the fluid force fh is applied is located at the flat surface 7b, and the pivot position 6 is located along the rotating direction of the disk from the position 8. However, when the disk starts to rotate, the position 8' where the fluid force fh' is applied is located at the tapered surface 7a. Thus according to equation (1), the contact force fc is larger when the disk starts to rotate. Wear of the contact portion 4 or the disk may occur, when the disk starts to rotate. The best way to avoid such wear is to coincide the position 8 with the position 8'. For example, when an area of the tapered surface 7a is larger than that of the flat surface 7b, the position 8 moves toward the side of the tapered surface 7b. Therefore it is desirable to make the area of the tapered surface 7a larger than that of the flat surface 7b. If the area of the tapered surface 7a becomes larger than that of the flat surface 7b, a contact area between the slider surface 7 and the disk becomes small, and stiction may be reduced. This structure is useful to make the system of contact reading or writing information to a disk which is very flat.

Figure 3A:
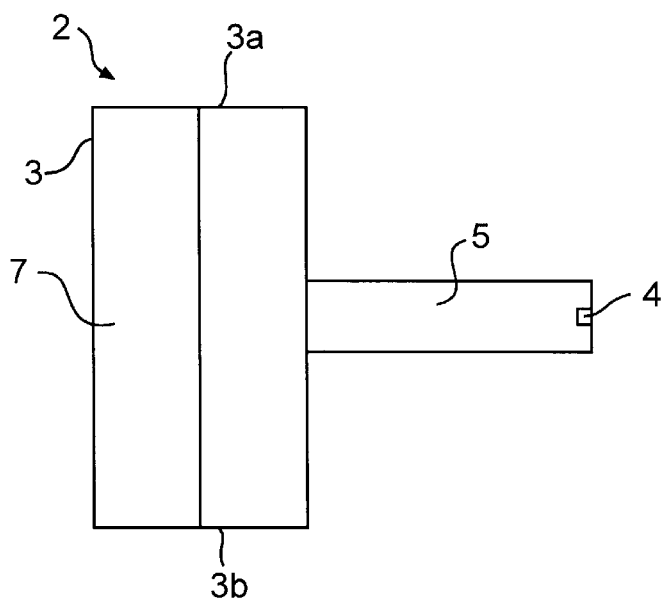
FIGS. 3(*a*) and 3(*b*) show top and end schematic views of a magnetic head device according to a second embodiment of the present invention.
Figure 3B:
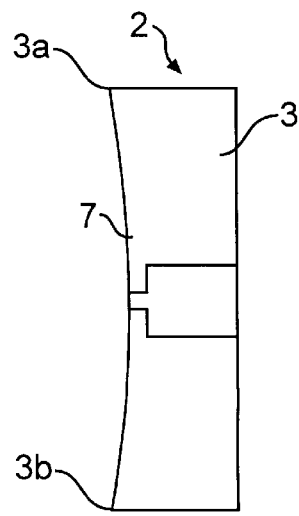

A structure of a magnetic head device according to a second embodiment of the present invention will be described with reference to FIGS. 3(a) and 3(b) which are top and end views, respectively.

The slider surface 7 of this embodiment is formed to have a concave surface confronting the disk, the concave curvature occurring along the direction perpendicular to the rotating direction of the disk. When the disk stops rotating, the slider 2 is in contact with the disk at the edges 3a, 3b of the flying member 3. The areas of these edges 3a,3b are very small, so it is possible to reduce stiction.

Figure 4A:
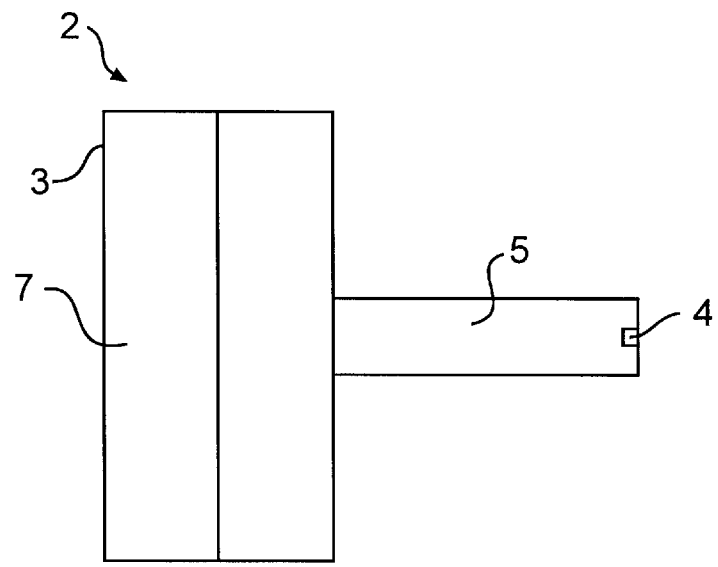
FIGS. 4(*a*) and 4(*b*) show top and end schematic views of a magnetic head device according to a third embodiment of the present invention.
Figure 4B:
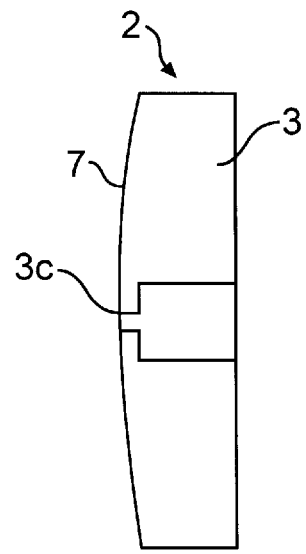

A structure of a magnetic head device according to a third embodiment of the present invention will be described with reference to FIGS. 4(a) and 4(b) which are top and end views, respectively.

The slider surface 7 of this embodiment is formed to have a convex surface confronting the disk, the convex curvature occurring along the direction perpendicular to the rotating direction of the disk. When the disk stops rotating, the slider 2 is in contact with the disk at the center portion 3c of the flying member 3. The area of the center portion 3c is very small, so it is possible to reduce stiction.

A structure of a magnetic head device according to a fourth embodiment of the present invention will be described with reference to FIGS. 5(a)–5(d).

Figure 5A:
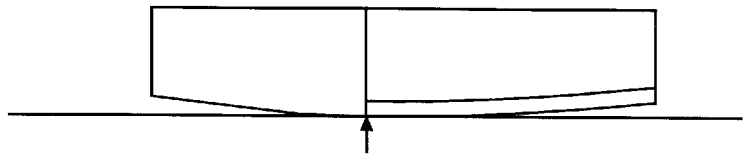
FIGS. 5(*a*)–5(*d*) are schematic views of a magnetic head device according to a fourth embodiment of the present invention.
Figure 5B:
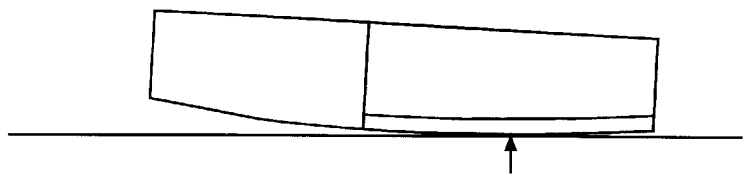
Figure 5C:
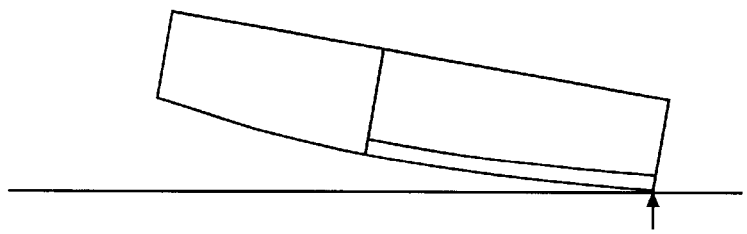
Figure 5D:
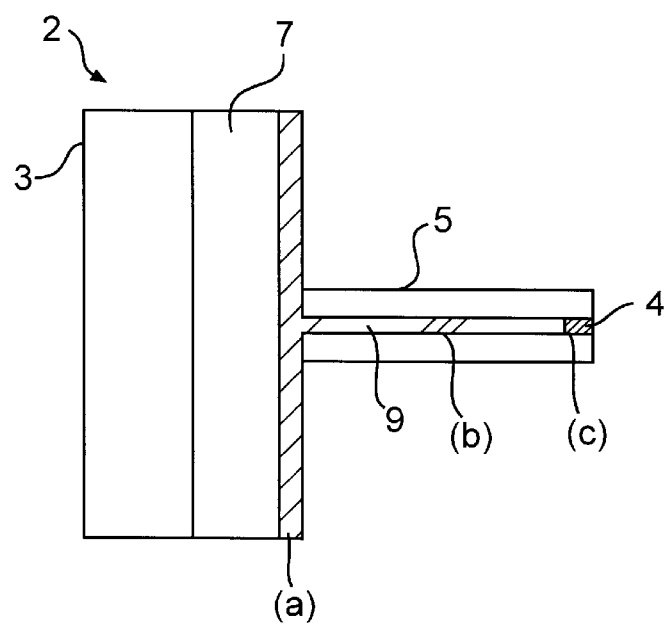
Figure 6A:
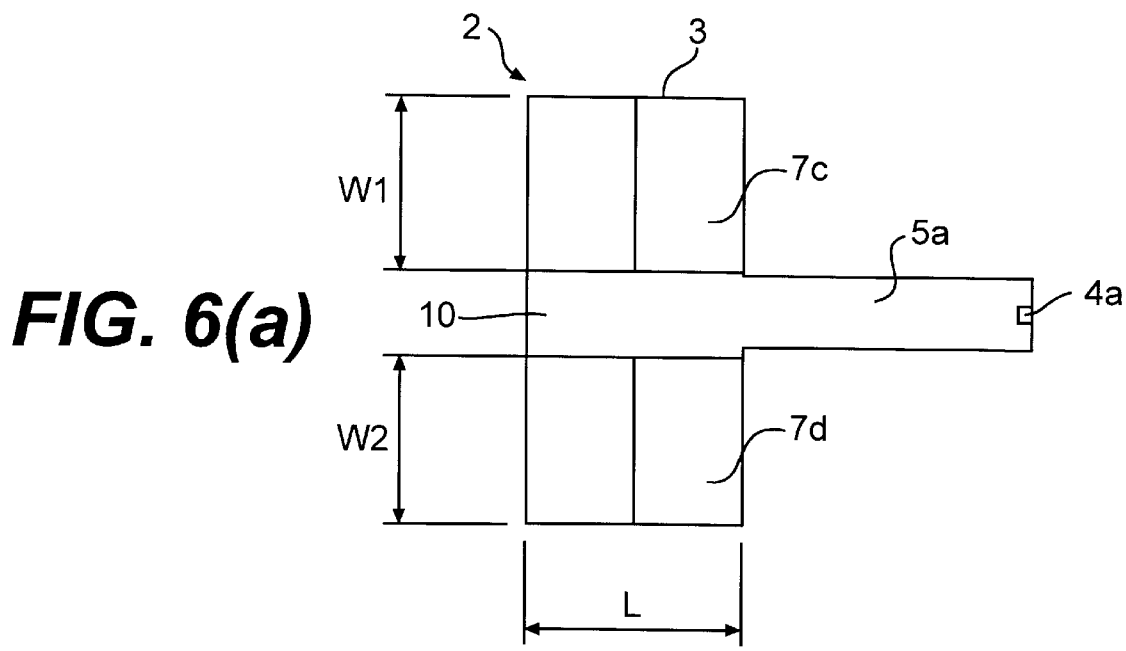
FIGS. 6(*a*)–6(*c*) are top, side and end schematic views of a magnetic head device according to a fifth embodiment of the present invention.
Figure 6B:
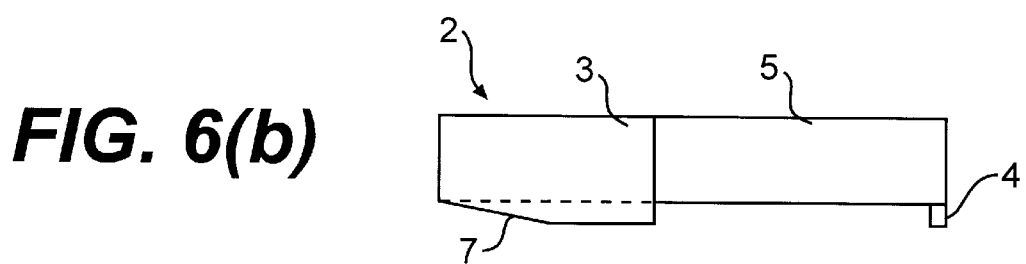
Figure 6C:
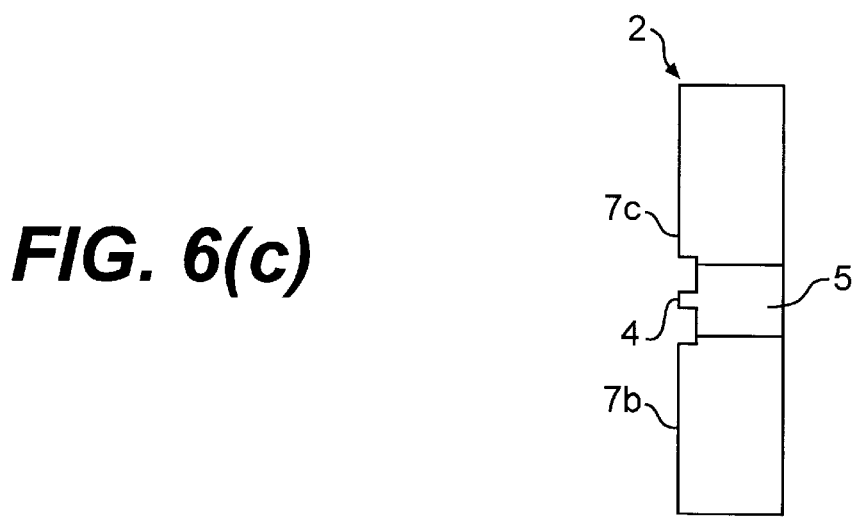

As seen in FIG. 5(d) which is a top view of the head device, the connecting member 5 of this embodiment has a connecting surface 9 which connects between the slider surface 7 and the contact portion 4. The surface 9 is raised relative to the remainder of the surface of the connecting member 5. The slider surface 7, the connecting surface 9, and the contact portion 4 which confront the disk are formed to be convex along the rotating direction of the disk. When the disk stops rotating, the top of the convex surface, for example the part of the slider surface 7 and the connecting surface 9, as shown in FIG. 5(a) and designated by "(a)" in FIG. 5(d), is kept in contact with the disk. The area of the top of the convex surface is very small, so it is possible to reduce stiction.

When the rotational speed of the disk is small, the part of the connecting surface 9, as shown in FIG. 5(b) and designated by "(b)" in FIG. 5(d), is kept in contact with the disk because the pitch angle of the slider 2 is also small. When the disk rotates constantly, the pitch angle becomes large enough to keep the contact portion 4 in contact with the disk, as shown in FIG. 5(c) and designated by "(c)" in FIG. 5(d). In general, when the the rotational speed of the disk is small, the flying condition of the slider 2 is unstable, so that a large contact force may be applied to the contact surface of the slider 2. According to this embodiment, when the rotational speed of the disk is small, the magnetic pole (not shown) is not worn down because the contact portion 4 is not kept in contact with the disk.

A structure of a magnetic head device according to a fifth embodiment of the present invention will be described with reference to FIGS .6(a)–6(c) which are top, side and end views, respectively.

The slider surface 7 which is described in FIG. 1 is divided into two parts 7c, 7d by a groove 10. The groove 10 is contiguous with the connecting surface 5a of the connecting member 5. In this structure, the maximum length L of the slider surface 7 along the rotating direction of the disk is defined to be the same as in the first embodiment. The maximum width of the slider surface 7 along the direction perpendicular to the rotating direction of the disk is defined top be the sum of the maximum width W1, W2 of parts 7c, 7d of the slider surface 7 in such direction:

$$W = W1 + W2 \tag{3}$$

According to this definition, the maximum length L is shorter than the maximum width W. Since the pitching stiffness of the fluid film between the slider surface 7 and the surface of the disk becomes lower, it is possible to reduce the variation of the contact force caused by the positioning error between the slider surface 7 and the contact portion 4. Also, the translational stiffness and rolling stiffness of the fluid film between the slider surface 7 and the surface of the disk become higher.

Sliders having a variety of structures can readily be constructed by means of etching methods. According to the same definitions of the maximum length L and the maximum width W, they produce the same effects as described above.

Figure 7A:
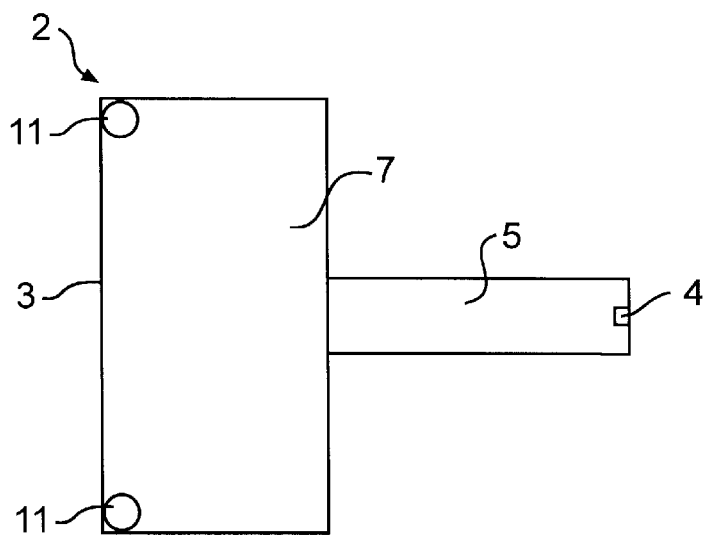
FIGS. 7(*a*)–7(*c*) are top, side and end schematic views of a magnetic head device according to a sixth embodiment of the present invention.
Figure 7B:
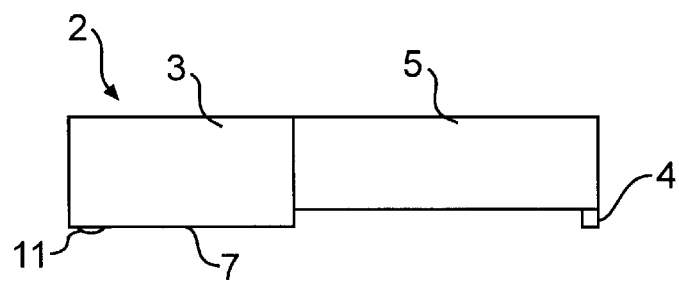
Figure 7C:
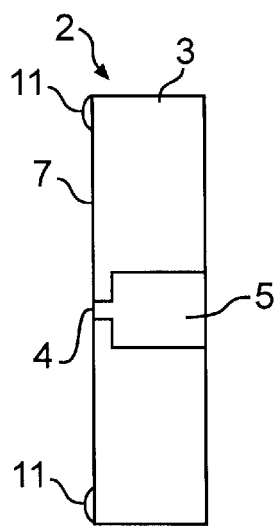

A structure of a magnetic head device according to a sixth embodiment of the present invention will be described with reference to FIGS. 7(a)–7(c) which are top, side and end views, respectively.

The slider surface 7 is a single flat surface. According to this structure, it is possible to reduce the variation of the position 8 (not shown) where the fluid force is applied, because the slider can readily be constructed to accurately have such a shape. For the same reason, the pivot position 6 (not shown) can be accurately controlled on the basis of the slider shape. Therefore, it is possible to determine the contact force accurately according to the equation (1).

A plurality of projections 11 are formed on the slider surface 7. When the disk stops rotating, the slider surface 7 is in contact with the disk at the projections 11 only. If the area of the projections 11 is small, it is possible to reduce stiction. The structures of the projection 11 is not limited the structure shown in FIG. 7. It is also possible to apply the structures as shown in FIG. 3 and FIG. 4 to this embodiment.

Figure 8A:
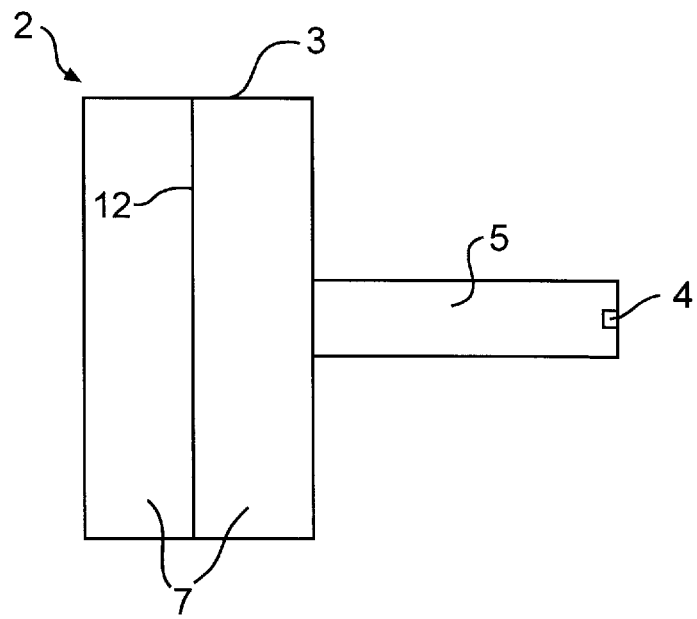
FIGS. 8(*a*)–8(*c*) are top, side and end schematic views of a magnetic head device according to a seventh embodiment of the present invention.
Figure 8B:
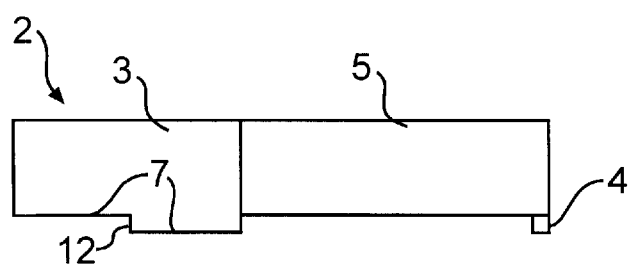
Figure 8C:
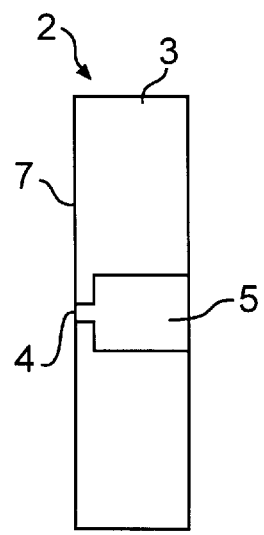

A structure of a magnetic head device according to a seventh embodiment of the present invention will be described with reference to FIGS. 8(a)–8(c) which are top, side and end views, respectively.

A slider surface 7 includes at least two steps along the rotating direction of the disk. The distance between the step and the disk becomes shorter along the rotating direction of the disk. The fluid force is applied at the edge 12 between the adjacent steps. This type of the slider surface can be readily constructed accurately by means of etching methods. According to this structure, it is possible to reduce the variation of the position 8 (not shown) where the fluid force is applied, because it is easy to make the outward form of the slider accurately. The pivot position 6 (not shown) can also be controlled accurately on the basis of the shape of the slider. Therefore it is possible to determine the contact force accurately according to equation (1). When the disk stops rotating, the slider surface 7 is kept in contact with the disk at the nearest step from the disk. If the area of the step is small, it is possible to reduce stiction.

Figure 9A:
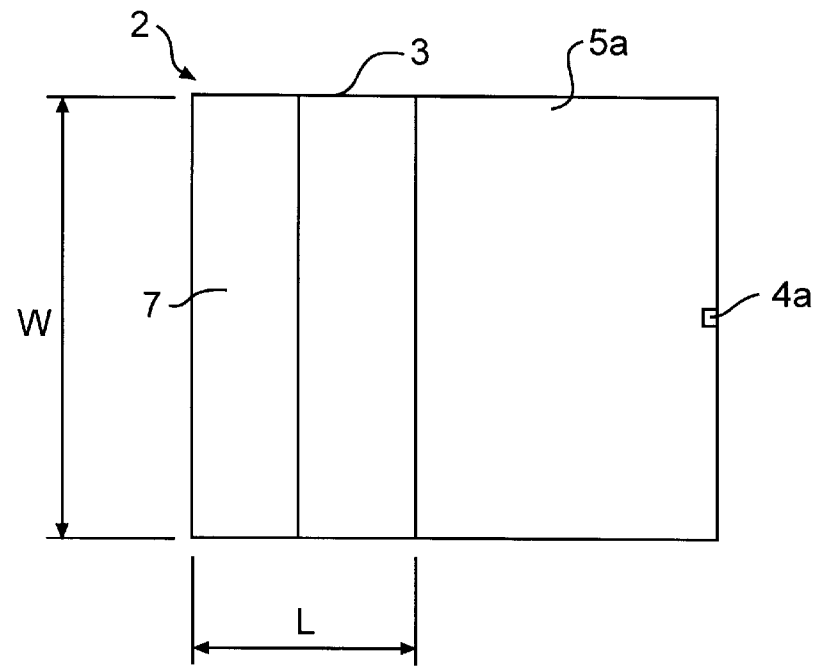
FIGS. 9(a)–9(c) are top, side and end schematic views of a magnetic head device according to an eighth embodiment of the present invention.
Figure 9B:
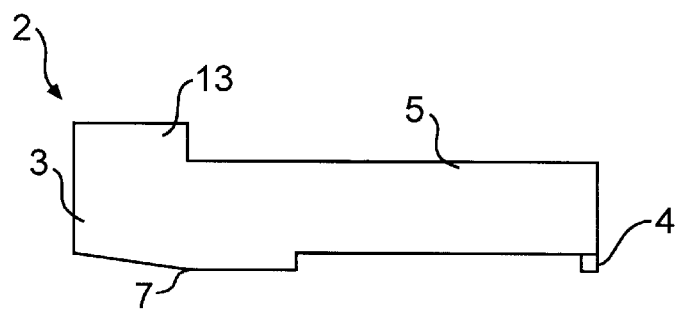
Figure 9C:
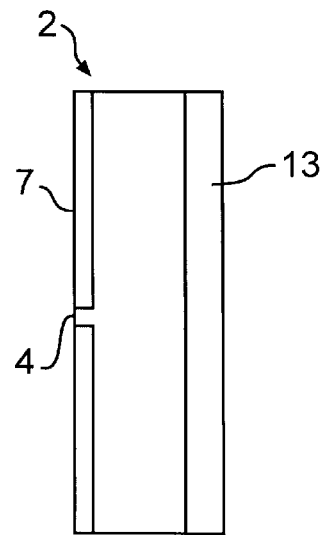

A structure of a magnetic head device according to an eighth embodiment of the present invention will be described with reference to FIGS. 9(a)–9(c) which are top, side and end views, respectively.

Inertia is caused by the undulation of the disk, the vibration of the disk, or an external shock applied to the device. According to this embodiment, the inertia is balanced with the fluid force only, so the contact force does not vary.

The connecting member 5 has the same width as the flying member 3 along the direction perpendicular to the rotating direction of the disk. Since the slider 2 is formed to have a substantially rectangular shape, the outward form can be readily constructed.

The maximum length L of the slider surface 7 along the rotating direction of the disk is shorter than the maximum width W of the slider surface 7 along the direction perpendicular to the rotating direction of the disk. The connecting member 5 has a surface 5a which confronts the disk. The surface 5a of the connecting member 5 is recessed from the slider surface 7. The contact surface 4a also has a very small area, so that only a small dynamic pressure is applied to the contact surface 4a, therefore, the fluid force fh is mainly applied to the slider surface 7.

In general, the center of gravity of the head (G) depends on the mass of the slider 2 and equivalent mass of the suspension (not shown). relative to the above embodiments, the position of G in the structure, thus far described, would be located further along the rotating direction of the disk, according to equation (2), the greater part of the inertia is allocated to the contact force, because the distance lg (not shown) between the position of G and the contact portion 4 becomes short. This is a cause of the variation of the contact force. In order to move the position of G in the direction opposite to the rotating direction of the disk, a projection 13 for counter-weight is located at the opposite side of the slider surface 7. If the position of G is located near the position where the fluid force is applied, the variation of the contact force may be reduced. In this case, the projection 13 requires only mass, so the structure or material are not limited. The structure of this embodiment can be applied to each of the embodiments described above.

Figure 10:
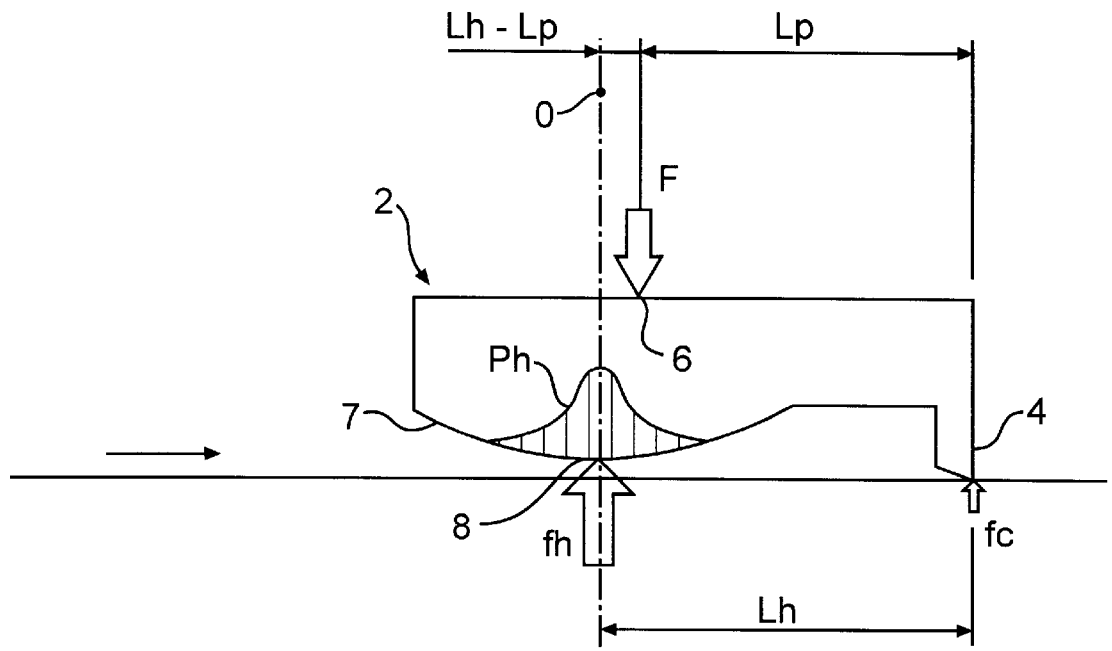
FIG. 10 is a schematic view showing a magnetic head device according to a ninth embodiment of the present invention.

A structure of a magnetic head device according to a ninth embodiment of the present invention will be described with reference to FIG. 10.

The purpose of this embodiment is to reduce the variation of the contact force caused by the positioning error between the slider surface and the contact portion.

The slider surface 7 is a convex surface, which confronts the disk and is curved along the rotating direction of the disk. The center of its curvature is near the pivot position 6 where a load F is applied. The distribution of the dynamic pressure (gage pressure) Ph is shown in FIG. 10. The position 8, where the fluid force fh is applied, is located near the portion which is closest to the disk.

Figure 11A:
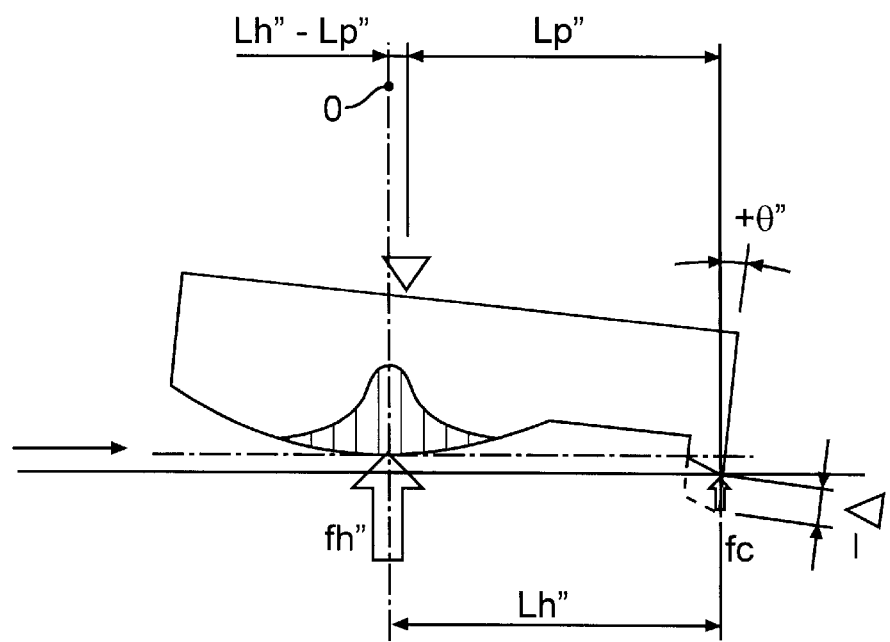
FIGS. 11(a)–11(c) are explanatory views showing the variation of the contact force according to the positioning error between the slider surface and the contact portion in FIG. 10.
Figure 11B:
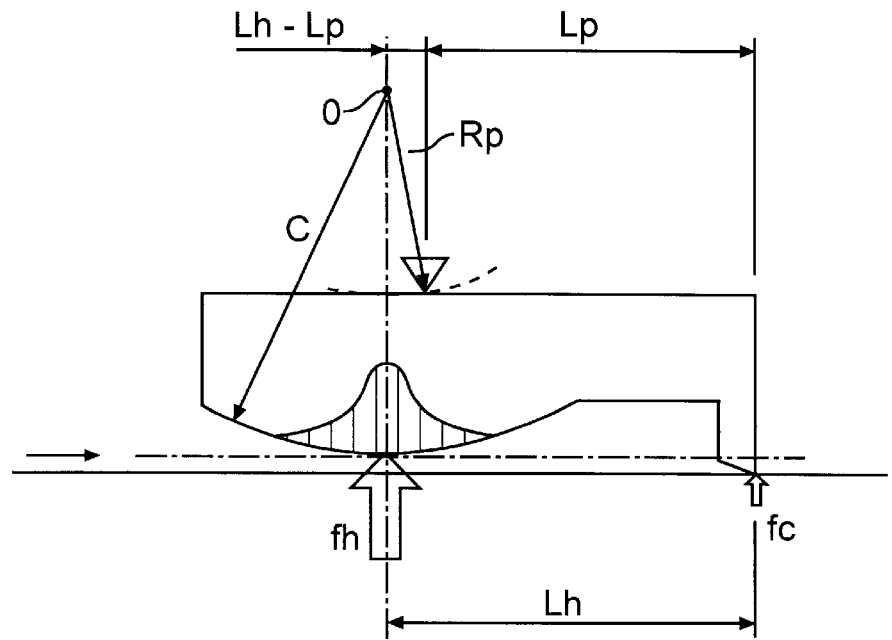
Figure 11C:
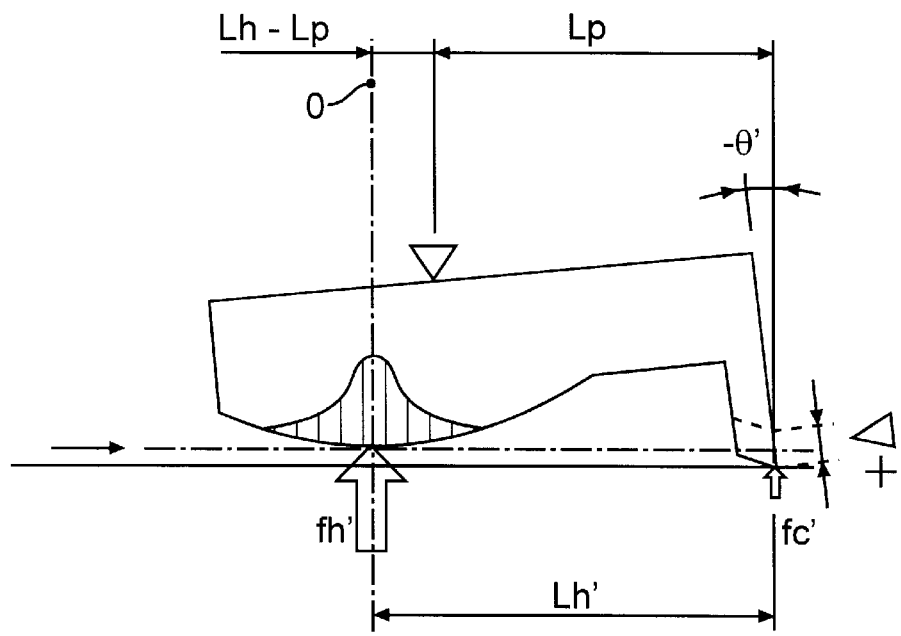

When the positioning error between the slider surface 7 and the contact portion 4 is made, the contact force fc varies. This variation of the contact force fc will be described with reference to FIGS. 11(a)–11(c). FIG. 11(b) shows the standard condition. FIG. 11(a) shows the condition that the contact portion 4 is recessed by Δ from the contact portion of the standard condition. FIG. 11(c) shows the condition that the contact portion 4 is projected by Δ from the contact portion of the standard condition.

When the contact portion 4 is recessed by Δ, the posture of the slider 2 changes, so that the pitching angle increases (+θ"). The position 8 where the fluid force fh is applied is still located near the portion which is closest to the disk. The distribution of the dynamic pressure Ph does not change. If some conditions that will be described are satisfied, it is possible to keep the distribution of the dynamic pressure ph to be constant. These conditions relate the length of the slider surface 7 along to the rotating direction of the disk, and the radius of the curvature of the slider surface 7. According to the combination of the length and the radius of the curvature, the dynamic pressure becomes equal to the atmospheric pressure in the range of the slider surface 7.

According to the change of the the posture of the slider 2, the distance lh between the position 8 and the contact portion 4, and the distance lp between the pivot position 6 and the contact portion 4, changes very little. The distance lh–lp between the pivot position 6 and the position 8 is shown in the following equation (4).

$$(lh-lp)-(lh''-lp'')=Rp\cdot\theta'' \tag{4}$$

"Rp" is the distance between the center of the curvature (O) of the slider surface and the pivot position 6.

This distance between positions 6 and 8 is shorter than that in the standard condition. The distance between the position 8 and the contact portion 4 changes very little.

$$lh''=lh \tag{5}$$

As a result, the variation of the contact force (dfc) is shown in the following equation (6).

$$dfc=\frac{Rp\cdot\theta''}{lh} \tag{6}$$

If the center of the curvature (O) of the slider surface is located near the pivot position 6, it is possible to reduce the variation of the contact force (dfc). If the center of the curvature of the slider surface (O) coincides with the pivot position 6, the contact force does not vary.

With reference to FIG. 11(c), when the contact portion 4 is projected by δ, the posture of the slider 2 changes, so that the pitching angle decreases (−θ'). According to the change of the the posture of the slider 2, the distance lh between the position 8 and the contact portion 4, and the distance lp between the pivot position 6 and the contact portion 4, changes very little. The distance between the pivot position 6 and the position 8 is shown in the following equation (7).

$$(lh'-lp')-(lh-lp)=Rp\cdot\theta' \tag{7}$$

The distance between positions 6 and 8 is longer than that in the standard condition. The distance between the position 8 and the contact portion 4 changes very little.

$$lh'=lh \tag{8}$$

So the variation of the contact force (dfc) is shown in the following equation (9).

$$dfc=\frac{Rp\cdot\theta'}{lh} \tag{9}$$

Thus, if the center of the curvature (O) of the slider surface is located near the pivot position 6, it is possible to reduce the variation of the contact force (dfc). If the center of the curvature (O) of the slider surface is coincides with the pivot position 6, the contact force does not vary.

According to this embodiment, if the dimensional accuracy of the pivot position is assured, it is possible to keep the contact force at a low level without the influence of the accuracy of manufacturing. The structure of this embodiment can be applied to each of the embodiments described above.

Figure 12:
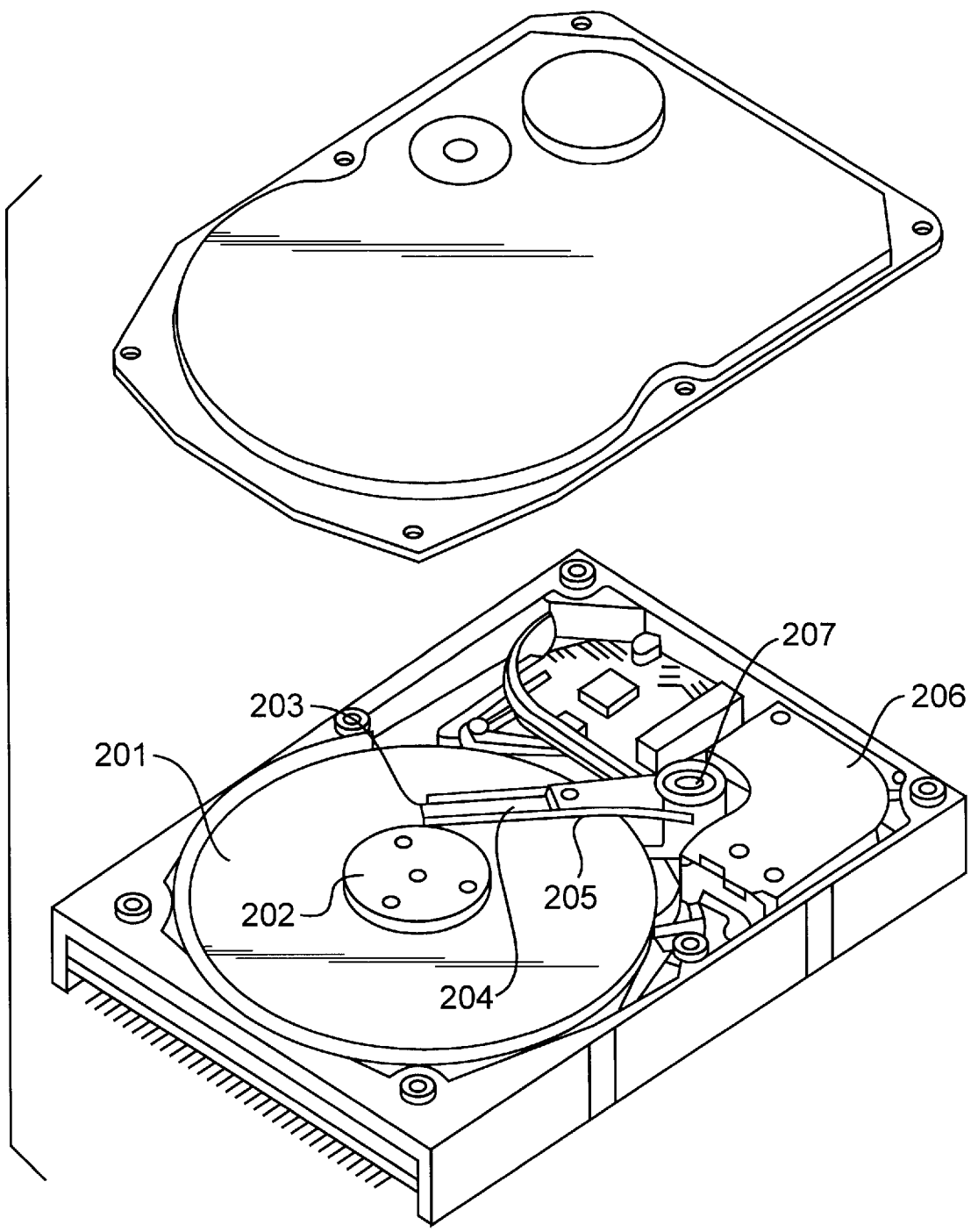
FIG. 12 is a schematic view showing a magnetic disk drive in which the magnetic head device of the present invention is used.
Figure 13:
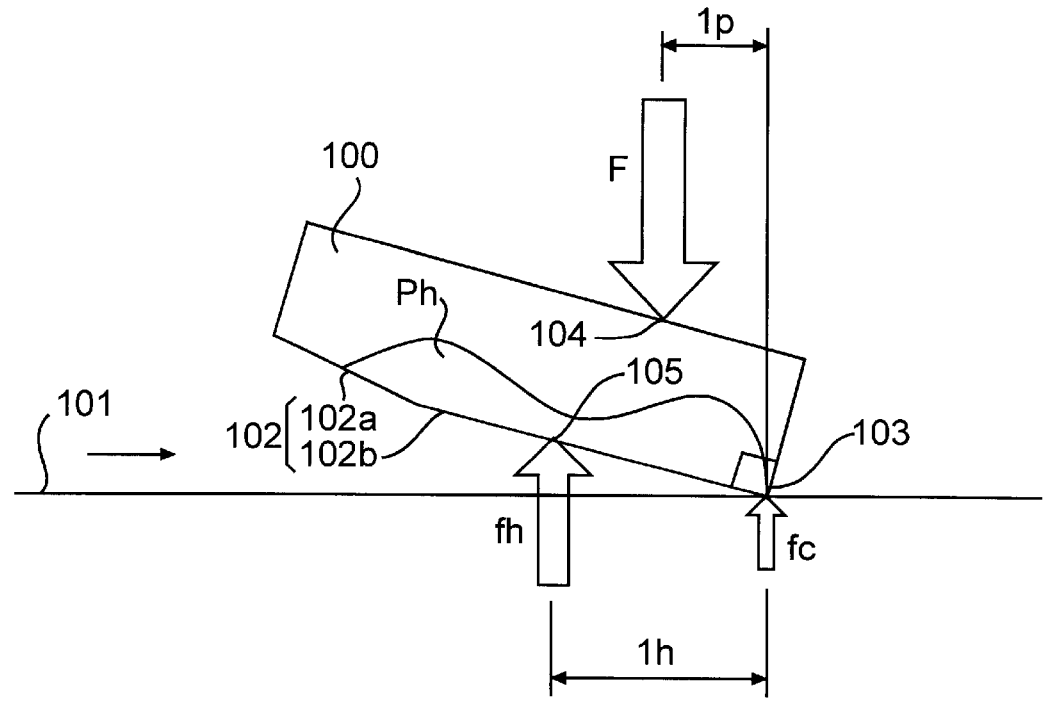
FIG. 13 is a schematic view showing a prior art taper-flat type slider including a contact portion.
Figure 14:
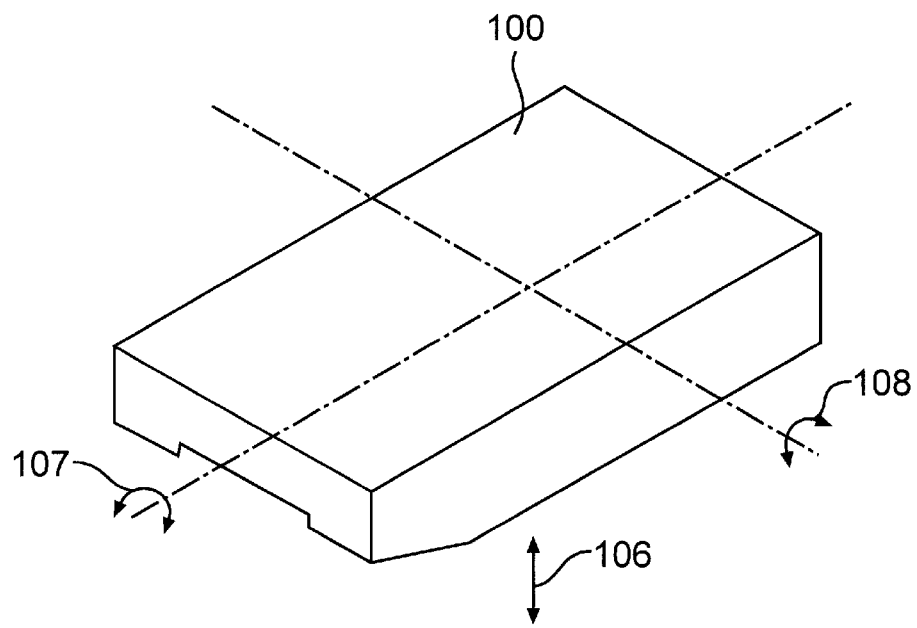
FIG. 14 is an explanatory view showing degrees of freedom in the prior art flying type slider.
Figure 15A:
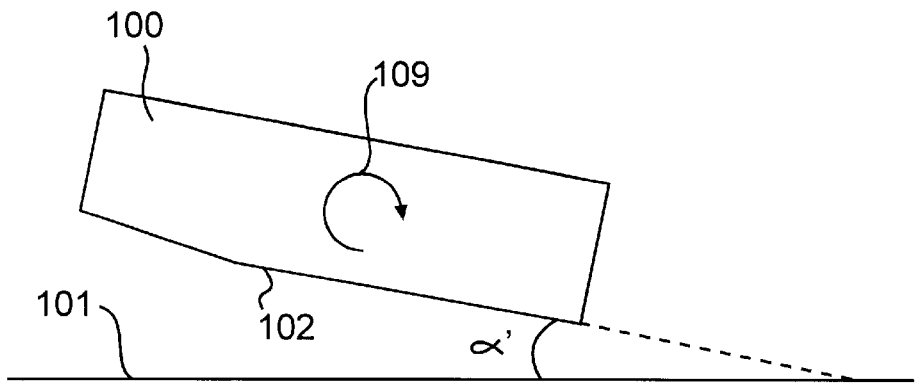
FIGS. 15(a)–15(c) are explanatory views showing the pitching stiffness of the prior art flying type slider.
Figure 15B:
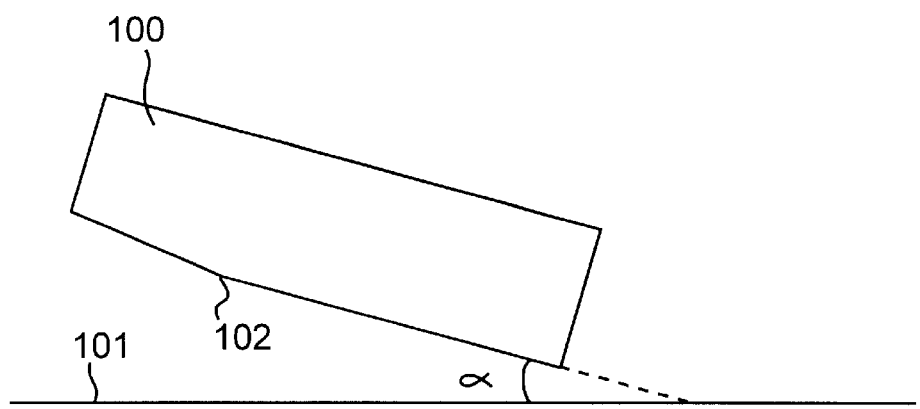
Figure 15C:
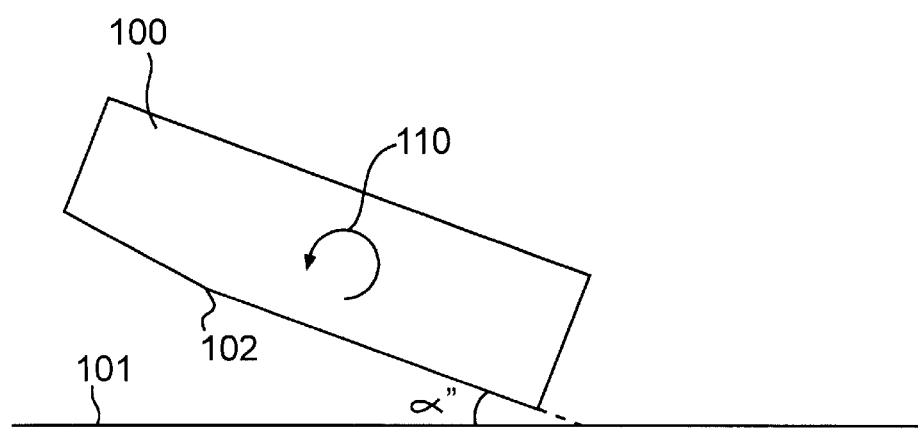
Figure 16A:
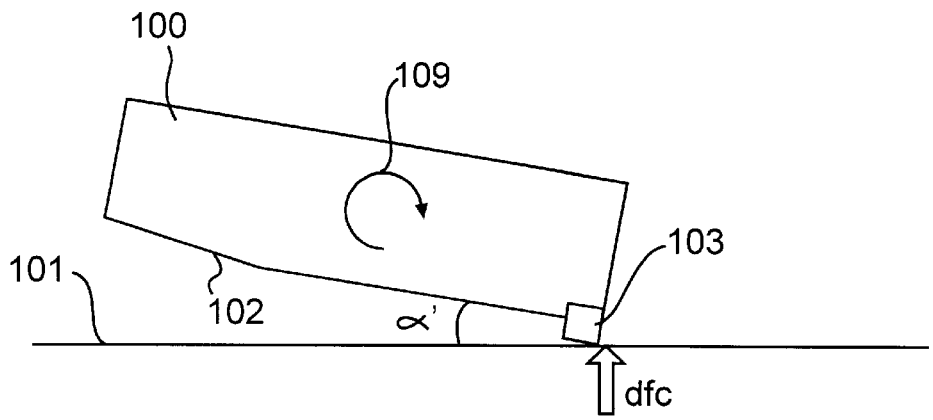
FIGS. 16(a)–16(c) are explanatory views showing the variation of the contact force according to the positioning error between the slider surface and the contact portion.
Figure 16B:
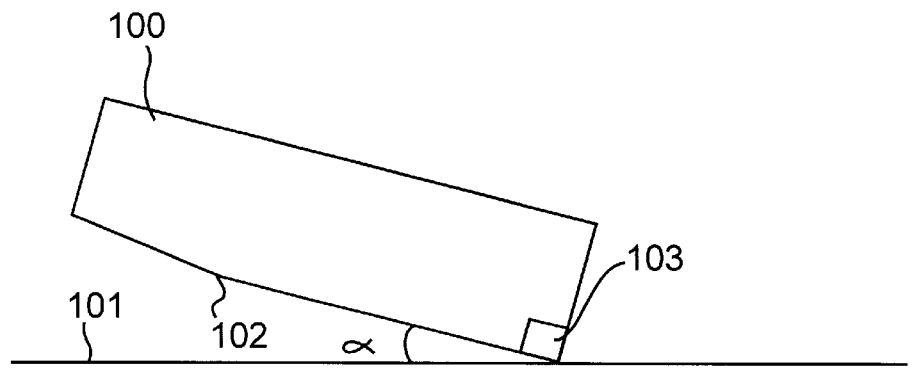
Figure 16C:
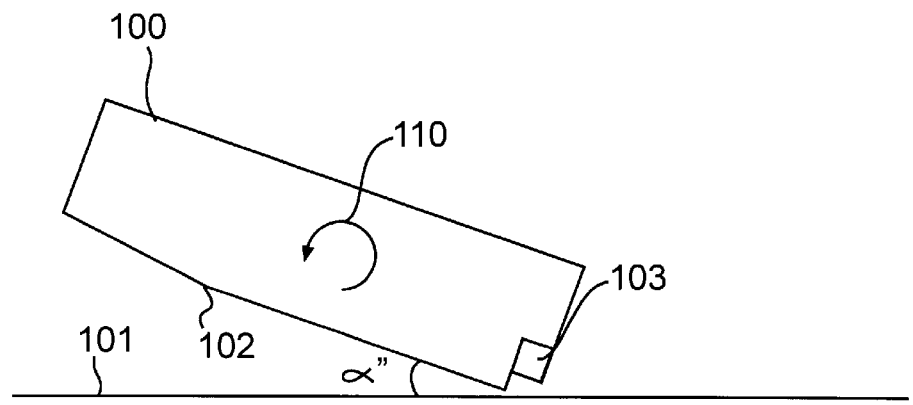
Figure 17:
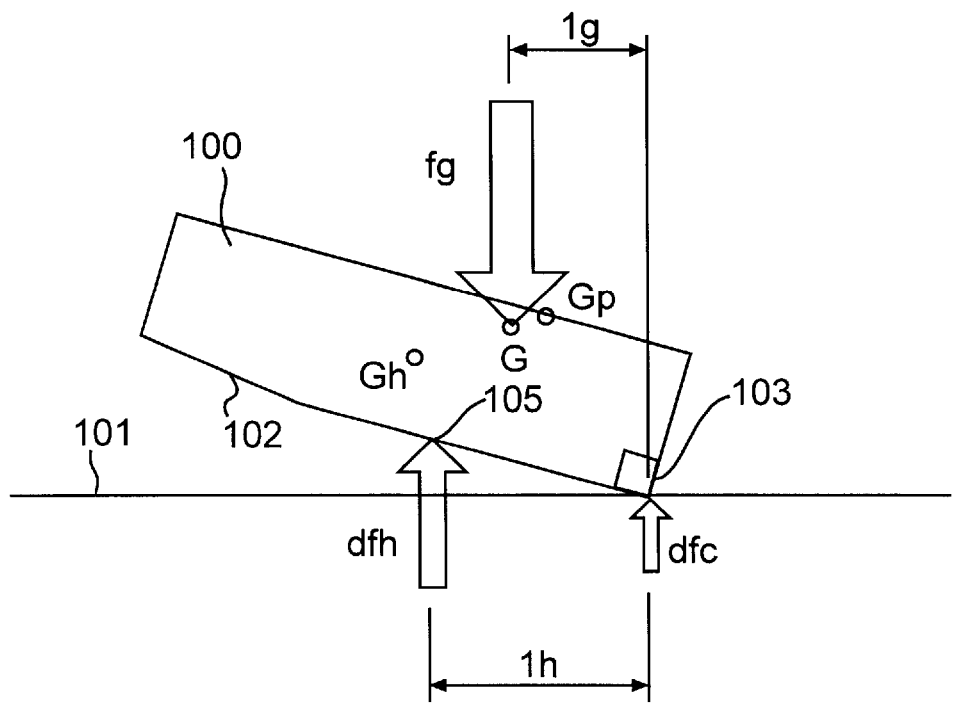
FIG. 17 is an explanatory view showing the variation of the contact force according to the influence of inertia.

A structure of a magnetic disk drive in which use the head of the present invention is used, will be described with reference to FIG. 12.

A disk 201 is set on a spindle 202, and rotated at a constant rotational speed by the spindle 202. A slider 203 carrying a magnetic pole is mounted on a tip end of a suspension 204, and accesses to the disk 201 in order to read and write data. The suspension 204 is connected to an end of an arm 205 which has a bobbin portion holding a driving coil (not shown). The other end of the arm 205 has a voice coil motor 206, which is a type of linear motor. The arm 205 is held by ball bearings (not shown) provided in two locations, i.e. above and below a fixing axis 207, and the arm 205 can be freely rotated and/or oscillated by the voice coil motor 206. The voice coil motor 206 has a driving coil wound around the bobbin portion of the arm 205, and a magnetic circuit formed of a permanent magnet (not shown)

arranged to sandwich the coil and to oppose each other, and an opposing yoke (not shown).

The head of the present invention is not limited to being applied to a magnetic disk drive in which a rotary actuator is used. It is possible to apply it to other types of magnetic disk drives, for example, a magnetic disk drive in which a linear actuator is used.

Thus in accordance with the magnetic head device according to embodiments of the present invention, a position where a sum of the dynamic pressure (fluid force) is applied, is located far from the contact portion, so a distance between the position where the fluid force is applied and the contact portion becomes long. Consequently, it is possible to keep the contact force low.

Further, a distance between the position of a center of gravity of the magnetic head device and the contact portion becomes long. So it is possible to reduce the variation of the contact force according to inertia which occurs by the undulation of the medium, the vibration of the medium, or the shock applied to the device from outside.

Further in accordance with the magnetic head device according to embodiments of the present invention, the inertia caused by the undulation of the medium, the vibration of the medium, or an external shock applied to the device is balanced with the fluid force only, so the contact force does not vary.

Also in accordance with the magnetic head device according to embodiments of the present invention, if the posture of the slider changes, it is possible to keep the distribution of the dynamic pressure constant. Consequently, it is possible to reduce the variation of the contact force caused by the positioning error between the slider surface and the contact portion.

Additionally in accordance with the magnetic disk drive according to embodiments of the present invention, it is possible to keep the contact force which is applied to the magnetic head device at a low level, and to reduce the variation of the contact force according to inertia caused by the undulation of the medium, the vibration of the disk, or an external shock applied to the device. Consequently, the life of the magnetic disk drive can be extended, because wear of the magnetic head device and the magnetic recording disk can be reduced.

Additionally in accordance with the magnetic disk drive according embodiments of the present invention, the inertia caused by the undulation of the medium, the vibration of the medium, or an external shock applied to the device is balance with the fluid force which is applied to the magnetic head device only, so the contact force does not vary. Consequently, the life of the magnetic disk drive can be extended, because wear of the magnetic head device and the magnetic recording disk can be reduced.

Further in accordance with the magnetic disk drive according to embodiments of the present invention, if the posture of the magnetic head device changes, it is possible to keep the distribution of the dynamic pressure constant. As a result, it is possible to reduce the variation of the contact force caused by the positioning error between the slider surface and the contact portion. Consequently, the life of the magnetic disk drive can be extended, because wear of the magnetic head device and the magnetic recording disk can be reduced.

Additional advantage and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic head device for reading information from or writing information to a rotating magnetic recording medium comprising:

a magnetic pole for reading the information from or writing the information to the medium; and a slider for supporting said magnetic pole and for moving said magnetic pole on the medium, said slider including a contact portion for maintaining contact between said magnetic pole and the medium, the contact portion being joined directly to said magnetic pole, a flying member for flying above the medium when the magnetic pole moves on the medium, the flying member having a surface for facing the medium, the surface having a length in a rotating direction of the medium short enough to accomplish low pitching stiffness, the surface having a width in a direction perpendicular to the rotating direction of the mediums, and a connecting member being coupled between the contact portion and the flying member, the connecting member having a length in the rotating direction of the medium long enough to maintain a desired level of contact force between the magnetic pole and the medium, the connecting member having a width in the direction perpendicular to the rotating direction of the medium, the width of the connecting member being less than the width of the surface of the flying member, wherein a dynamic pressure generated by fluid-flow caused by rotation of the medium and acting on the slider is applied mainly to the surface of the flying member.

2. A magnetic disk drive comprising:

a magnetic recording disk;

a rotating device for rotating said disk; and a magnetic head device including a magnetic pole for reading the information from or writing the information to the disk; and a slider for supporting said magnetic pole and for moving said magnetic pole on the disk, said slider including a contact portion for maintaining contact between said magnetic pole and the disk, the contact portion being joined directly to said magnetic pole, a flying member for flying above the disk when the magnetic pole moves on the disk, the flying member having a surface for facing the disk, the surface having a length in a rotating direction of the disk short enough to accomplish low pitching stiffness, the surface having a width in a direction perpendicular to the rotating direction of the disk, and a connecting member being coupled between the contact portion and the flying member, the connecting member having a length in the rotating direction of the disk long enough to maintain a desired level of contact force between the magnetic pole and the medium, the connecting member having a width in the direction perpendicular to the rotating direction of the disk, the width of the connecting member being less than the width of the surface of the flying member, wherein a dynamic pressure generated by fluid-flow caused by rotation of the disk and acting on the slider is applied mainly to the surface of the flying member.

3. A magnetic head device for reading information from or writing information to a rotating magnetic recording medium, comprising:

a magnetic pole for reading the information from or writing the information to the medium; and a slider for supporting said magnetic pole and for moving said magnetic pole on the medium said slider including a contact portion for maintaining contact between the magnetic pole and the medium, the contact portion being joined directly to said magnetic pole, a flying member for flying above the medium when the magnetic pole moves on the medium, the flying member having a surface for facing the medium, the surface having a length in a rotating direction of the medium and a width in a direction perpendicular to the rotating direction of the medium and along the surface of the flying member, the width being greater than the length, and a connecting member rigidly joined between the contact portion and flying member, the connecting member having a width in a direction perpendicular to the rotating direction of the medium, the width of the connecting member being less than the width of the surface of the flying member, wherein dynamic pressure generated by fluid-flow caused by rotation of the medium and acting on the slider is applied mainly to the surface of the flying member.

4. A magnetic head device according to claim 3, wherein the connecting member has a mass less than that of the flying member.

5. A magnetic disk drive comprising:

a magnetic recording disk;

a rotating device for rotating said disk; and a magnetic head device including a magnetic pole for reading information from or writing information to the disk, and a slider for supporting said magnetic pole and for moving said magnetic pole on the disk, said slider including a contact portion for maintaining contact between the magnetic pole, and the disk, the contact portion being joined directly to said magnetic pole a flying member for flying above the disk when the magnetic pole moves on the disk, the flying member having a surface for facing the disk, the surface having a length in a rotating direction of the disk and a width in a direction perpendicular to the rotating direction of the disk and along the surface of the flying member, the width being greater than the length, and a connecting member rigidly joined between the contact portion and the flying member, the connecting member having a width in a direction perpendicular to the rotating direction of the disk, the width of the connecting member being less than the width of the surface of the flying member, wherein dynamic pressure generated by fluid-flow caused by rotation of the disk and acting on the slider is applied mainly to the surface of the flying member.

6. A magnetic disk drive according to claim 5, wherein the connecting member has a mass less than that of the flying member.

7. A magnetic head device for reading information from or writing information to a rotating magnetic recording medium, comprising:

a magnetic pole for reading the information from or writing the information to the medium; and a slider for supporting said magnetic pole and for moving said magnetic pole on the medium, said slider including a contact portion for maintaining contact between said magnetic pole and the medium, the contact portion being joined directly to said magnetic pole.

8. A magnetic head device according to claim 7, wherein the connecting member has a mass less than that of the flying member.

9. A magnetic disk drive according to claim 1, wherein the connecting member has a mass less than that of the flying member.

10. A magnetic disk drive according to claim 9, wherein the connecting member has a mass less than that of the flying member.

\* \* \* \* \*